Patented Mar. 17, 1931

1,796,801

UNITED STATES PATENT OFFICE

FERDINAND MÜNZ, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR THE PRODUCTION OF ACID AND LIME RESISTING DERIVATIVES OF UNSATURATED FATTY ACIDS

No Drawing.    Application filed February 15, 1926. Serial No. 88,460.

By allowing concentrated sulfuric acid to act on unsaturated higher fatty acids the well known sulfuric acid esters of hydroxy fatty acids are formed. These sulfuric acid esters are soluble in water, but after standing for some time in the presence of acid become decomposed, very rapidly in the heat, separating insoluble fatty acids. They consequently possess a very limited resistance to acids. Also their alkali salts in hard water invariably still cause turbidity and precipitates which may become very troublesome.

There are, indeed, a number of sulfated products commercially known as soap, Universal oil, Avirol and many similar products which are superior to the ordinary Turkey red oil in so far as they are less easily separated from their solutions by acids or calcareous water; but their solubility in the presence of acids or lime salts is only moderate and insufficient for many purposes.

I have now discovered a new process for the production of new derivatives of unsaturated fatty acids consisting in the action of sulfuric anhydride on unsaturated fatty acids of the general formula $C_nH_{2n-2}XCOOR$, in which X indicates hydrogen or hydroxyl (OH), whilst COOR indicates the carboxylic or an esterified carboxylic group.

Whereas the action of sulfuric acid is restricted to the formation of a sulfuric acid ester, a different product is formed with sulfuric anhydride, a sulfonic group being bound directly to a carbonatom, since after boiling with acid the product still contains sulfur.

In the case of rincinoleic acid, for instance the action probably proceeds according to the following formula:

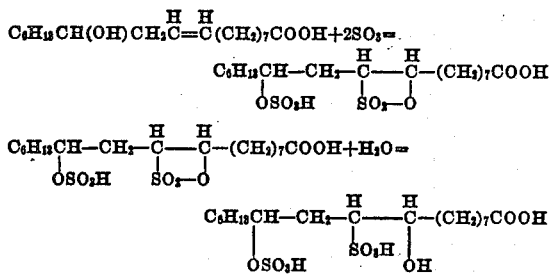

In order to produce this new compound which contains sulfur in direct combination with carbon, two molecules sulfuric anhydride in proportion to one molecule fatty acid must be employed, but more than one molecule sulfuric anhydride is sufficient for obtaining mixtures of the new compound and less quantities of unsulfonated starting material and not so highly sulfonated products, which mixtures are resistant to acids and lime salts and are implied by as the new reaction products in the following and in the claims.

Products of this composition have not yet been described. In the rare cases where fuming sulfuric acid was used, always less than one molecule sulfuric anhydride has been taken.

The products obtained with increased quantities of sulfuric-anhydride, owing to their special constitution are distinguished by their resistance to acids and lime salts.

They differ from Turkey-red oil, Monopole soap and similar products by their property of resisting prolonged boiling with acids but retaining sulfur in the form of a sulfonic group; neither are they separated from their aqueous solutions by acids nor precipitated on addition to very hard water, even in the presence of alkalies.

Sulfuric anhydride may be made to act in this way on any unsaturated fatty acid or their glycerides. It may be used by itself or dissolved in sulfuric acid to form fuming sulfuric acid.

Example 1

70 grms. fuming sulfuric acid containing 66% sulfuric anhydride are run into a solution of 100 grms. oleic acid commercial in 300 grms. carbon tetrachloride at a temperature of 5 to 0° C. while stirring.

After allowing to react for some hours the mixture is diluted with 150 cc. water, the carbon tetrachloride distilled off and the residue washed once or twice with a saturated solution of a common salt.

The product thus obtained yields a clear solution in water without requiring previous neutralizing with alkali and is not decomposed by prolonged boiling with acid.

*Example 2*

Ricinoleic acid is heated to 150–160° C. until its acidity is reduced by approximately one-half, when principally diricinic acid is formed corresponding to the formula:

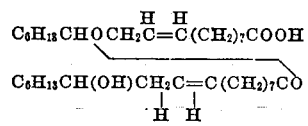

70 grms. fuming sulfuric acid containing 66% sulfuric anhydride are run into a solution of 100 grms. diricinic acid in 300 grms. carbon tetrachloride at a temperature slightly below 0° C.

After stirring for several hours this solution is diluted with 150 cc. water mixed with caustic soda solution 20° Bé. until it reacts neutral. When the carbon tetrachloride is distilled off, the residue, when cold, is filtered from the separated Glauber's salt and evaporated down to 250 grms.

The product obtained behaves like that of Example 1.

I claim:

1. Process for the production of new derivatives of unsaturated fatty acids resistant to acids and not precipitated by calcareous water comprising reacting with sulfuric anhydride on unsaturated fatty acids of the general formula $C_nH_{2n-2}XCOOR$, in which formula X indicates hydrogen or hydroxyl whilst COOR indicates the carboxylic or an esterified carboxylic group, more than 1 molecule of sulfuric anhydride being used in proportion to 1 molecule of fatty acid.

2. Process for the production of new derivatives of unsaturated fatty acids resistant to acids and not precipitated by calcareous water comprising reacting with sulfuric anhydride dissolved in sulfuric acid on unsaturated fatty acids of the general formula $C_nH_{2n-2}XCOOR$ in which formula X indicates hydrogen or hydroxyl, whilst COOR indicates the carboxylic or an esterified carboxylic group, more than 1 molecule of sulfuric anhydride being used in proportion to 1 molecule of fatty acid.

3. As new compounds sulfonated derivatives of unsaturated fatty acids being strongly hygroscopic substances, viscous liquids in form of their concentrated aqueous solutions, being resistant to acids and not precipitated by calcareous water, being obtainable by reacting with sulfuric anhydride on unsaturated fatty acids of the general formula $C_nH_{2n-2}XCOOR$, in which formula X indicates hydrogen or hydroxyl, whilst COOR indicates the carboxylic or an esterified carboxylic group, more than 1 molecule of sulfuric anhydride being used in proportion to 1 molecule fatty acid.

4. Process for the production of new derivatives of unsaturated fatty acids resistant to acids and not precipitated by calcareous water comprising reacting with sulfuric anhydride dissolved in sulfuric acid on ricinoleic acid in the proportion of more than 1 molecule sulfuric anhydride to 1 molecule ricinoleic acid.

5. As new compounds sulfonated derivatives of ricinoleic acid being strongly hygroscopic substances, viscous liquids in form of their concentrated aqueous solutions, being resistant to acids and not precipitated by calcareous water, being obtainable by reacting with sulfuric anhydride dissolved in sulfuric acid on ricinoleic acid in the proportion of more than 1 molecule sulfuric anhydride to 1 molecule ricinoleic acid.

6. Process for the production of new derivatives of unsaturated fatty acids resistant to acids and not precipitated by calcareous water comprising reacting with two molecules of sulfuric anhydride on one molecule of an unsaturated fatty acid compound of the general formula $C_nH_{2n-2}(OH)COOR$, in which formula COOR indicates the carboxylic or an esterified carboxylic group.

In witness whereof I have hereunto signed my name this 26th day of January, 1926.

FERDINAND MÜNZ.